US012615261B2

(12) United States Patent
Hassler et al.

(10) Patent No.: US 12,615,261 B2
(45) Date of Patent: Apr. 28, 2026

(54) ENTERPRISE USER ACCESS DISCOVERY AND MANAGEMENT USING POLICY AND ENTITLEMENT FRAMEWORK

(71) Applicant: T-Mobile Innovations LLC, Overland Park, KS (US)

(72) Inventors: John Hassler, Batavia, IL (US); Sindhu Kakarla, Leander, TX (US); Onn Lin Lee, Renton, WA (US); Kevin Kwok Leung, Shoreline, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 151 days.

(21) Appl. No.: 18/513,282

(22) Filed: Nov. 17, 2023

(65) Prior Publication Data

US 2025/0168170 A1    May 22, 2025

(51) Int. Cl.
*H04L 9/40* (2022.01)

(52) U.S. Cl.
CPC .......... *H04L 63/104* (2013.01); *H04L 63/101* (2013.01)

(58) Field of Classification Search
CPC .. H04L 63/104; H04L 63/101; H04L 63/0263
See application file for complete search history.

(56) References Cited

U.S. PATENT DOCUMENTS

| | | | | |
|---|---|---|---|---|
| 8,503,981 B1 * | 8/2013 | Xue | ...................... | H04W 12/08 |
| | | | | 715/752 |
| 8,935,311 B2 * | 1/2015 | Hannel | ............... | H04L 63/0218 |
| | | | | 709/200 |
| 9,577,891 B1 * | 2/2017 | Avery | ................. | H04L 41/0893 |
| 11,582,609 B2 * | 2/2023 | Zhu | ........................ | H04W 12/61 |
| 12,170,581 B2 * | 12/2024 | Gautama | ............... | H04L 63/102 |
| 2003/0177389 A1 * | 9/2003 | Albert | .................... | H04L 63/20 |
| | | | | 726/1 |

(Continued)

OTHER PUBLICATIONS

Zhou, Qian, et al. "Towards fine-grained access control in enterprise-scale Internet-of-Things." IEEE Transactions on Mobile Computing 20.8 (2020): 2701-2714. (Year: 2020).*

(Continued)

*Primary Examiner* — Jung W Kim
*Assistant Examiner* — Sameera Wickramasuriya

(57) ABSTRACT

A system and method for enabling fine-grained access to enterprise applications in an enterprise network. The method includes receiving, via a discovery application running on a computing device, user input from a user, where the user input identifies at least one of an application name, a server name, or an Internet Protocol (IP) address associated with a computing resource for accessing an enterprise application; comparing, via the discovery application, the user input to application information stored in a database accessible by the discovery application; sending, via the discovery application, a message to the user in response to determining a match between the user input and the application information, where the message identifies a membership group containing the computing resource for accessing the enterprise application; and enabling the user to access the membership group using the computing resource when the user is a member of the membership group.

11 Claims, 11 Drawing Sheets

(56) References Cited

U.S. PATENT DOCUMENTS

| 2004/0098446 A1* | 5/2004 | Styles ..................... H04L 67/75 |
| | | 709/200 |
| 2008/0256458 A1* | 10/2008 | Aldred ................ G06F 21/6218 |
| | | 715/752 |
| 2011/0107327 A1* | 5/2011 | Barkie ..................... G06F 8/63 |
| | | 707/769 |
| 2014/0059645 A1* | 2/2014 | Hannel ................... H04L 63/08 |
| | | 726/3 |
| 2017/0163666 A1* | 6/2017 | Venkatramani ..... H04L 63/1416 |
| 2021/0029174 A1* | 1/2021 | Kunduru ................. H04L 63/20 |
| 2022/0030001 A1* | 1/2022 | Poetter ............... H04L 41/0843 |
| 2022/0078190 A1* | 3/2022 | Hydell ................... H04L 63/10 |

OTHER PUBLICATIONS

Rech, Alexander, Christian Steger, and Markus Pistauer. "A decentralized service-platform towards cross-domain entitlement handling." 2019 IEEE International Conference on Blockchain (Blockchain). IEEE, 2019. (Year: 2019).*
Foreign Communication From a Related Counterpart Application, Partial EP Search Report and EP Search Opinion dated Mar. 21, 2025 EP Application No. 24209993.5.

* cited by examiner

200

500

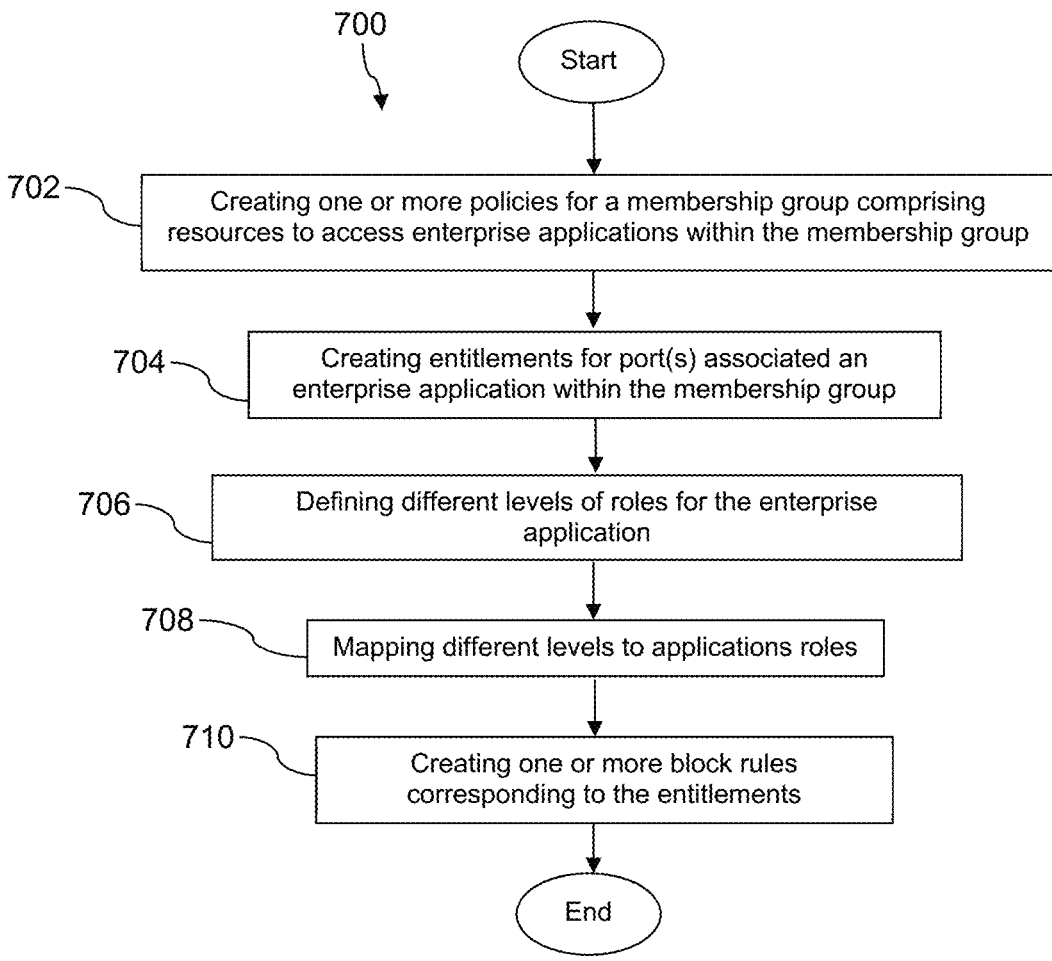

700

Start

702 — Creating one or more policies for a membership group comprising resources to access enterprise applications within the membership group 704 — Creating entitlements for port(s) associated an enterprise application within the membership group 706 — Defining different levels of roles for the enterprise application 708 — Mapping different levels to applications roles 710 — Creating one or more block rules corresponding to the entitlements End

ENTERPRISE USER ACCESS DISCOVERY AND MANAGEMENT USING POLICY AND ENTITLEMENT FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data communication systems transfer data packets between user devices and machines to provide data communication services like internet access, media streaming, and user messaging. Such data communication systems may include Internet Protocol (IP) networks configured to implement one or more technologies to improve efficiency, service delivery, quality, and the like. These technologies may include systems for Software-Defined Networks (SDNs), Network Function Virtualization (NFV), network hardware trust, and the like.

A number of security mechanisms may be used to secure communications across data networks. For example, Virtual Private Networks (VPNs) may be employed to create a secure connection between two devices located remotely from one another and connected via a network such as a public data network. A VPN may include one or more network tunnels associated with data packets, which may be encrypted using one or more mechanisms such as the Internet Protocol Security (IPSec) protocol suite.

VPNs may further include virtual servers configured to allow the sharing of underlying physical machine and network resources. Communication service providers may desire to build new servers through virtualization to allow for maximum processing efficiency on a communications network for cloud computing. Virtualization promotes network segmentation, more flexible maintenance, processing resource availability, and disaster recovery on the network. Instead of using a separate physical computer for each new server, a plurality of virtual servers may execute and share physical computer resources in a managed network environment.

Software-Defined Perimeter (SDP) technology is another mechanism that may be used to secure communications across data networks. SDP generally refers to a set of network security isolation framework that can be dynamically configured on demand and can replace traditional physical isolation facilities or devices. The SDP establishes a cryptographic-based perimeter protection mechanism, where the perimeter can be deployed anywhere, such as on a network, in a cloud, on a hosting center, on a private enterprise network, or deployed in these positions at the same time. Typically, only devices authenticated and authorized by the SDP can access protected services and facilities, which may otherwise be invisible to other devices.

SUMMARY

In an embodiment, a method for discovering membership groups to access enterprise applications is disclosed. The method comprises receiving, via a discovery application running on a computing device, user input from a user, where the user input identifies at least one of an application name, a server name, or an Internet Protocol (IP) address associated with a computing resource for accessing an enterprise application. The method further comprises comparing, via the discovery application, the user input to application information stored in a database accessible by the discovery application; sending, via the discovery application, a message to the user in response to determining a match between the user input and the application information, where the message identifies a membership group containing the computing resource for accessing the enterprise application; and enabling the user to access the membership group using the computing resource when the user is a member of the membership group.

In another embodiment, a system for updating firewalls in an enterprise network is disclosed. The system comprising a processor, a non-transitory memory configured to store programming instructions, and a discovery application configured to execute the programming instructions. When executed, the programming instructions are configured to cause the processor to retrieve firewall information about firewalls in the enterprise network, upload the firewall information to a security group in the enterprise network, and receive a notification about a new firewall added to the enterprise network, where the notification includes routing information of subnets accessed via the new firewall. Execution of the programming instructions is further configured to cause the processor to send the routing information to a security application connected to the discovery application, where the security application is configured to use the routing information to create a new entitlement reflecting the new firewall; and restrict access through the new firewall based on the new entitlement and at least one block rule corresponding to the new entitlement.

In yet another embodiment, a method for enabling fine-grained access to enterprise applications is disclosed. The method comprises defining, via a discovery application running on a computing device, an access policy for a membership group; creating, via the discovery application, entitlement rules specifying computing resources for accessing enterprise applications within the membership group; and receiving, via the discovery application, a request from a user to access the membership group. The method further comprises granting or denying the user access to one of the enterprise applications in the membership group while restricting the user from accessing another one of the enterprise applications in the membership group, where user access is granted based on one or more of the access policies, the entitlement rules, or blocking rules corresponding to the entitlement rules.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 7 is a flowchart of a method for enabling granular access according to an embodiment of the disclosure.

DETAILED DESCRIPTION

Figure 1:
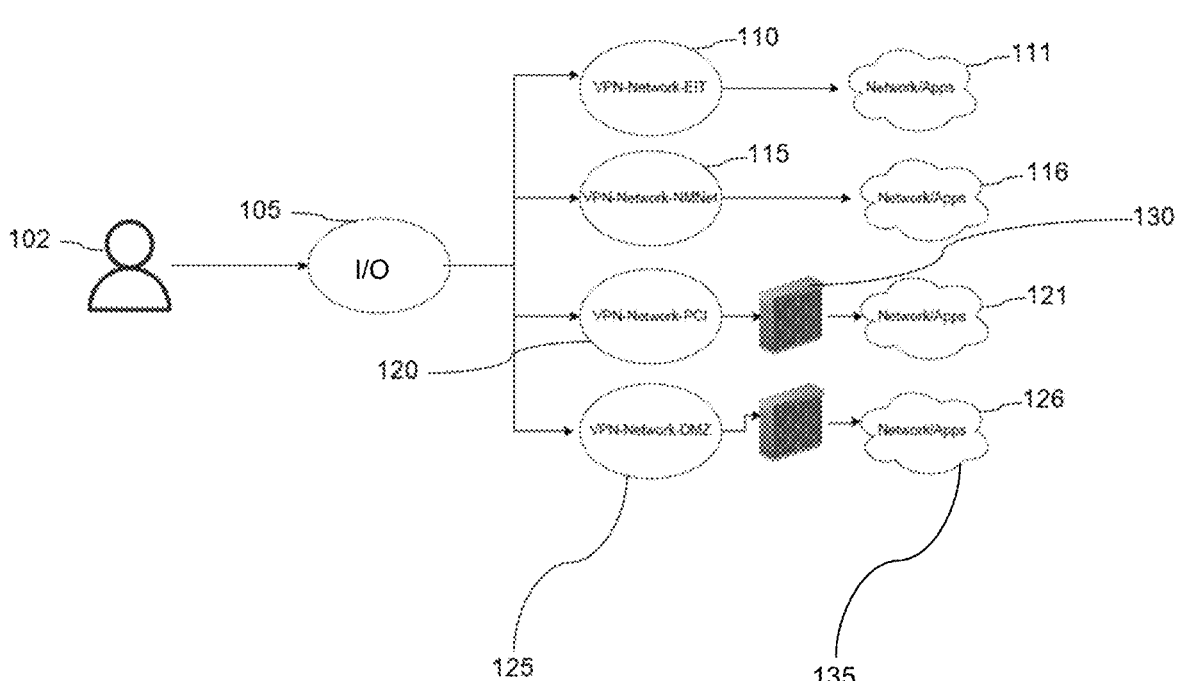
FIG. 1 is a block diagram of a communications system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to drawings, and techniques illustrated below, but may be modified within the scope of the appended claims along with their full scope of equivalents.

Disclosed herein are systems and methods for implementing a self-service model whereby individual application users may obtain access to network resources (e.g., applications) on a network-level. To this end, the disclosure provides a multi-purpose interface by which application owners may create policy and entitlements mapping applications/resources to membership groups. Additionally, one or more block rules corresponding to the entitlements may be automatically created and enforced (e.g., so as to restrict non-members from accessing computing resources, access to which is restricted to members of membership groups). Thus, the present disclosure provides a framework for defining and enforcing access permissions and block rules associated with membership groups, thereby enabling users granular access to one or more particular applications in a given membership group, e.g., while restricting user access to one or more applications in that group. This is in contrast to frameworks in other approaches, where once a user is granted access to a membership group, all applications within that membership group become available/accessible to the user. This approach supports fine grained (e.g., more nuanced and/or more discriminating) definition of user access while at the same time being a scalable solution applicable across a large information technology system (e.g., across a large enterprise's computing system).

In some aspects, such policies, entitlements, and/or blocking rules may be populated into a database accessible to the multi-purpose interface, which may be extended to users to facilitate/automate discovery of particular applications or membership groups to which users need access. Should the user discover a membership group to which the user is not a member, the user may send (e.g., via the multi-purpose interface) an access request to an application owner associated with that membership group. If granted, the user may subsequently access one or more particular applications in the membership group (e.g., based on the policy and entitlements for that group) while being restricted to one or more other applications in the membership group (e.g., based on the block rules).

The multi-purpose tool is further configured to retrieve firewall/routing information about firewalls/segments in the enterprise network, and the multi-purpose tool may provide such information to a security group configured to create and upload entitlements to appropriate policies. Upon receiving firewall/routing information containing a notification about a newly added firewall in the enterprise network, the multi-purpose tool may send updated firewall/routing information notification to the security group, which may then create a new entitlement for the newly added firewall and add the new entitlement to an appropriate policy, where the new entitlement and corresponding block rule may automatically be enforced. Thus, access permissions for newly added firewalls/segments may be automatically created and applied without manual intervention. These and other aspects are detailed below.

Turning now to FIG. 1, a system 100 is described. In an embodiment, the system 100 comprises a private network such as an intranet or a virtual private network (VPN) 100, which may use a public network such as the Internet to link remote sites or branches together. The VPN 100 may be deployed by an organization or company so that employees may securely and/or remotely access (e.g., via client devices) resources and/or services provided by the organization or company. To this end, the VPN 100 may include an input/output (I/O) interface 105 by which a user 102 (e.g., an employee) may establish a connection to the VPN 100 (e.g., after performing authentication, registration, etc.). The I/O interface 105 may comprise any suitable mechanism such as an application programming interface (API), a graphical user interface (GUI), a network interface controller (NIC), a network adapter, or the like.

In some implementations, the user 102 may directly connect to the VPN by physically connecting the user's client device (not shown) to the VPN 100. In other implementations, the user 102 may indirectly connect to the VPN 100 by establishing a networking tunnel with the VPN 100 from outside the VPN 100.

Additionally, the VPN 100 may be divided into one or more domains or Active Directory (AD) groups, where members are classified into groups based on certain criteria and given access to certain resources. Each AD group may each include a set of users, objects, computers, or other members managed by an employer or administrator (e.g., within an AD domain). Access to AD groups may be controlled via certain rules or policies (e.g., access permissions) set forth by an entity (e.g., an administrator, a network operations or services team, etc.) of an organization or company to which the VPN 100 belongs. The rules/policies for a particular AD group may vary depending on the roles of members in that group.

In the present example, the VPN 100 comprises a VPN-Network-Enterprise Information Technology (EIT) AD group 110, a VPN-Network-Network Management (NM) Network (NMNet) AD group 115, a VPN-Network-Payment Card Industry (PCI) AD group 120, and a VPN-Network-Demilitarized Zone (DMZ) AD group 125. The VPN-Network-EIT AD group 110 may control applications/resources for running an enterprise. The VPN-Network-NMNet AD group 115 may control applications/resources for managing network devices (e.g., of an enterprise). The VPN-Network-PCI AD group 120 may control applications/resources for a PCI environment. The VPN-Network-DMZ AD group 125 may control applications/resources for a perimeter network (e.g., which may restrict access to an internal network such as a local area network (LAN)). In other examples, the VPN 100 may comprise a different quantity of AD groups and/or different types (e.g., a security group, a distribution group, an accounting group, a sales group, etc.) of AD groups.

Each VPN AD group 110, 115, 120, and 125 is configured to provide its members access to respective resources 111, 116, 121, and 126 such as servers, network segments, websites, programs, and/or applications. For example, if the user 102 in FIG. 1 belongs to the VPN-Network-EIT AD group 110, the user 102 may utilize the interface 105 to request access to one or more network resources 111 (e.g., an application) controlled by the VPN-Network-EIT AD group 110.

It should be understood that each VPN AD group 110, 115, 120, and 125 in FIG. 1 may comprise a network object (not shown) such as, e.g., an information element (IE) containing a description about the AD group. In some aspects, network objects may comprise routing information associated with each VPN AD group 110, 115, 120, and 125 their respective underlying resources 111, 116, 121, and 126. Additionally/Alternatively, a network object may comprise quality of service (QOS) definitions, setup parameters, user identifiers, etc.

A user such as an administrator (e.g., a certain user having all access to an app owner's applications) of an AD group may grant permissions and user rights to members of that group as a whole, where various levels of permissions and/or rights may be granted to different AD groups. User rights generally specify the roles of the members within a particular AD group, while permissions generally specify which members may access resources of a particular AD group as well as the level of access assigned to that AD group.

When AD groups are employed in existing approaches, permissions and rights are granted to all members of a particular AD group rather than to individual members of that AD group. Therefore, once an employee 102 requests and obtains access to a particular AD group, that employee 102 would have access to all resources behind that AD group. For example, if the employee 102 in FIG. 1 belongs to the VPN-Network-EIT AD group 110, the employee 102 may access all network segments/applications 103 within the VPN-Network-EIT AD group 110. That is, existing approaches do not enable granular access to particular network segments or applications within the VPN-Network-EIT AD group 110.

Moreover, if the employee 102 in FIG. 1 is new or has been added to a new group, the employee 102 may not know which network segments or applications are needed. Similarly, an employee 102 may not know which VPN AD group(s) 110, 115, 120, and/or 125 the employee 102 is to request access to obtain such network segments or applications. While employees may glean such information based on tribal knowledge (e.g., from a co-worker), existing approaches do not provide a mechanism for such employees to discover to which AD group he/she belongs. Consequently, the employee 102 may need to search each VPN AD group 110, 115, 120, and 125 in FIG. 1 to identify a particular network segment or application.

In some aspects, the VPN 100 may employ one or more security features such as firewalls, proxy servers, access codes, access control lists (ACLs), encryption, decryption, compression, decompression, or the like. As shown in FIG.

1, for example, the VPN 100 may comprise a first firewall 130 established between the VPN-Network-PCI AD group 120 and its underlying resources, and a second firewall 135 established between the VPN-Network-DMZ AD group 125 and its underlying resources. Each firewall 130 and 135 may be configured to regulate access (e.g., allow or block) to resources within the VPN-Network-PCI AD group 120 and the VPN-Network-DMZ group AD 125, respectively.

The firewalls 130 and 135 may include virtual firewalls, physical firewalls, or any combination thereof. A virtual firewall, such as a firewall hosted on a virtual machine, provides network security for network traffic flowing in a virtual network. A physical firewall, such as a firewall implemented on hardware, provides network security for network traffic flowing in a physical network.

While two firewalls 130 and 135 are depicted in FIG. 1, it should be understood that one or more firewalls may be added or removed to the VPN 100 (e.g., due to capacity and/or business-related reasons). For example, an organization or company may install a new firewall (not shown) to protect traffic between the VPN-Network-NMNet AD group 115 and its underlying resources 116.

In this example, the VPN-Network-NMNet AD group 115 would need to be updated (e.g., via a respective network object) to reflect the new firewall. Such updates are typically performed manually on a step-by-step basis. That is, existing approaches do not provide an automated mechanism by which an employee 102 may discover new firewalls or network resources. Hence, the employee 102 may encounter an error when attempting to access a new segment of the VPN 100. While a troubleshooting process may be performed to address such an error, this process may consume an undesirable amount of time and/or resources.

Figure 2:
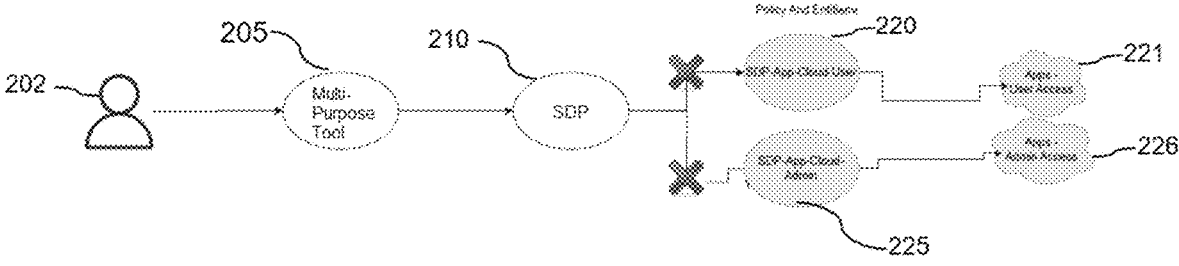
FIG. 2 is a block diagram of a communications system according to another embodiment of the disclosure.

Referring now to FIG. 2, a system 200 is illustrated according to an embodiment of the disclosure. The system 200 comprises a multi-purpose tool 205 connected to or integrated with a Software-Defined Perimeter (SDP) tool 210. Such connection/integration may be established via one or more interface devices such as an application programming interface (API), a graphical user interface (GUI), a network interface controller (NIC), a network adapter, or the like. The SDP tool 210 may run on one or more physical machines, virtual machines, cloud instances, or any combination thereof.

It is to be understood that the multi-purpose tool 205 and/or the SDP tool 210 may each be implemented using a memory, one or more network interfaces, and a processing device operatively coupled to the memory and one or more network interfaces. Each processing device may be programmed to execute instructions stored in memory to implement the functionality of the respective tool (e.g., the multi-purpose tool 205 or the SDP tool 210). For example, the multi-purpose tool 205 and the SDP tool 210 may execute on one or more computing devices (e.g., communication devices 800 and 900 in FIGS. 8 and 9) and/or computer systems (e.g., system 1100 in FIG. 11), such as described further hereinafter.

In an embodiment, the multi-purpose tool 205 may be configured to allow individual requesters (e.g., application owners) to set rules/policies themselves. For instance, via the multi-purpose tool 205, an application owner 202 may use the SDP tool 210 to define policy and entitlements for applications (e.g., "Apps" in resources 111, 116, 121, or 126) belonging to the application owner 202, as described below and with reference to FIG. 3. Such policy and entitlements may specify which particular applications a user (e.g., an employee/member of a particular AD group) is permitted to access or use. It is noted that while sometimes in the specification the description of access gatekeeping may refer to a user, it is understood that this is a convenience of language and clarity. That is, access is granted not based on the identity of a user, but on the association of the user identity to an AD group.

FIG. 2 provides an example where a user such as an application owner 202 uses the multi-purpose tool 205 with the SDP tool 210 to create policy and entitlements for two AD groups, denoted as "SDP-App-Cloud-User AD Group" 220 and "SDP-App-Cloud-Admin AD group" 225, the latter of which may refer to a certain user (e.g., administrator, employer, group manager, etc.) having all access to the application owner's application(s).

The policy and entitlements define a first mapping between the SDP-App-Cloud-User AD group 220 and user-level applications 221, and a second mapping between the SDP-App-Cloud-Admin AD group 225 and administration-level applications 226. In FIG. 2, for example, the policy and entitlements specify that if a user (e.g., user 102) is not a member of the SDP-App-Cloud-User AD group 220, that user 102 is not permitted to access any user-level applications 221 or administration-level applications 226. Hence, the user 102 would be blocked access in this case, as denoted by the two "X" marks between the SDP tool 210 and the two SDP AD groups 220 and 225.

To obtain access to a blocked AD group such as the SDP-App-Cloud-User AD group 220, the user 102 may send an access request to the application owner 202, e.g., via any one or more of the multi-purpose tool 205, the SDP tool 210, or a third-party tool or program connected to or integrated with the multi-purpose tool 205 and/or the SDP tool 210. The application owner 202 may then accept or deny the user's access request. For example, the application owner 202 may accept the access request by adding the user 102 to the appropriate AD group (e.g., SDP-App-Cloud-User AD group 220). Alternatively, the application owner 202 may deny the access request, in which case the application owner 202 would not add the user 102 to that AD group (e.g., SDP-App-Cloud-User AD group 220).

Figure 3:
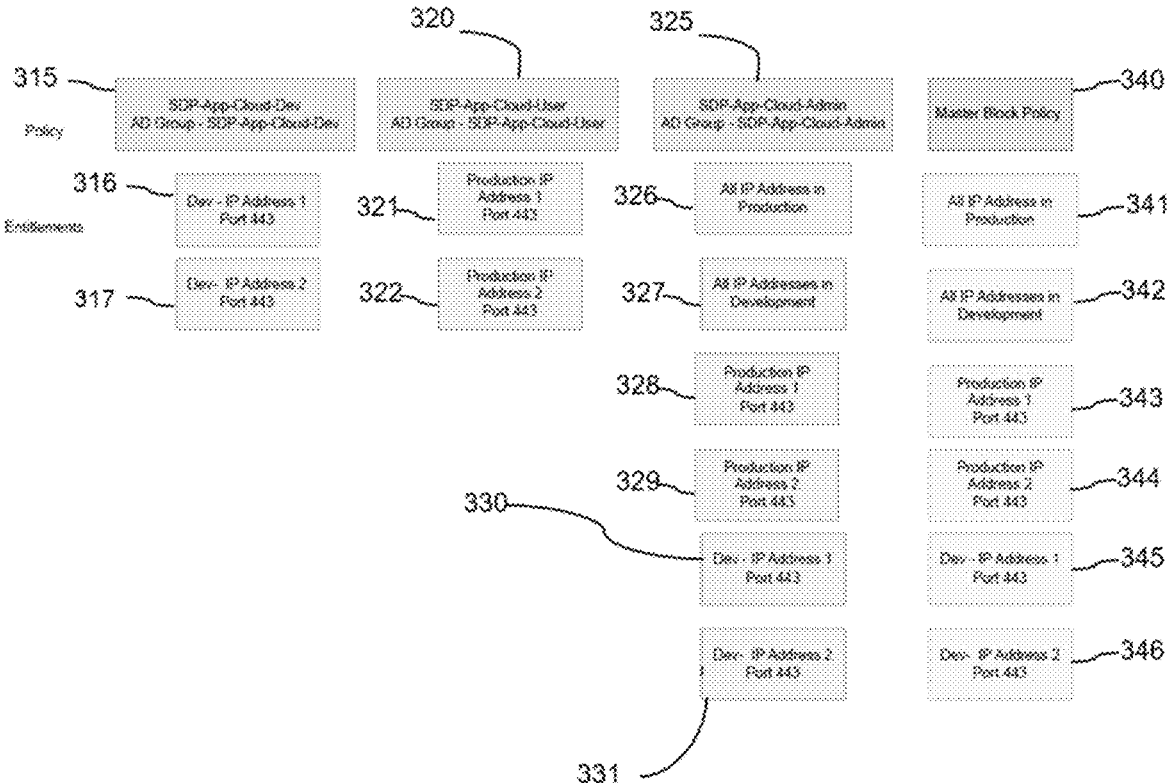
FIG. 3 depicts a granular access mapping table according to an embodiment of the disclosure.

Referring to FIG. 3, a granular access mapping table 300 is described. As previously discussed, users such as application owners may utilize the multi-purpose tool 205 of FIG. 2 to create and map policies and entitlements for their respective applications. Policies generally specify which users (e.g., members of which AD groups) are entitled access to an application, while entitlements generally specify what type of access is permitted.

An application owner 202 (FIG. 2) may assign certain roles to one or more applications per AD group. As shown in FIG. 3, for example, the application owner 202 may (e.g., via multi-purpose tool 205) define a Development (Dev) role, a User role, and an Administration (Admin) role for 3 different policies, and create 3 respective AD groups denoted as SDP-App-Cloud-Dev AD group 315, SDP-App-Cloud-User AD group 320, and SDP-App-Cloud-Admin AD group 325. When creating these 3 policies, the application owner 202 may provide a description describing the purpose of each respective policy. The application owner 202 may provide such descriptions via network objects (not shown) contained in the respective AD groups 315, 320, and 325.

Additionally, the application owner 202 may enumerate entitlements for each policy or AD group 315-325. The entitlements define which resources (e.g., servers, IP addresses, subnets, ports) a user 102 is allowed to access (e.g., in order to perform his/her respective job). For example, in the entitlements under the policy for the SDP- App-Cloud-Dev AD group 315, the application owner 202 may list all development IP addresses and ports corresponding to development servers. It should be understood that while the entitlements shown in FIG. 3 contain IP and port information, entitlements may contain additional and/or different information in other aspects. For example, entitlements may contain one or more of a host name, a server name, or a domain name system (DNS) of a database, server, webpage, etc.

In the example shown in FIG. 2, the SDP-App-Cloud-Dev AD group 315 contains two entitlements. A first entitlement 316 indicates that "Dev-IP Address 1" provides access to IP port 443 (which may associate with a particular application), and a second entitlement 317 indicates that "Dev-IP Address 2" provides access to IP port 443. Thus, any user in the SDP-App-Cloud-Dev AD group 315 may be entitled access to these two entitlements 316 and 317.

The application owner 102 may then repeat this process for the SDP-App-Cloud-User AD group 320 and the SDP-App-Cloud-Admin AD group 325. The entitlements 326-331 for the latter SDP-App-Cloud-Admin AD group 325 may include all IP addresses and ports for development and production, while the entitlements 316, 317 for the SDP-App-Cloud-Dev AD group 315 and the entitlements 321, 322 for the SDP-App-Cloud-User AD group 310 may include specific IP addresses/ports for a specific developer and a specific user/producer. As discussed further below, an application owner 202 may create such entitlements to enable granular access control for a user (e.g., employee 102) to one or more specific applications (and/or resources such as network subnets, segments, IP ports) in a given AD group (e.g., SDP-App-Cloud-User AD group 320), i.e., rather than granting the user 102 access to all applications in that given AD group (such as in existing approaches).

For discussion purposes, the entitlements enumerated for the 3 AD groups 315, 320, and 325 in FIG. 3 may be viewed as "allowed" entitlements. In an embodiment, after an application owner 202 creates an allowed entitlement, a corresponding "block" entitlement may be created and assigned to a Master Block Policy 340. In some aspects, the system 200 may be configured to automatically create and assign such a block entitlement in response to a corresponding allowed entitlement being created. In other aspects, the application owner 202 may manually create a block entitlement and assign it to the Master Block Policy 340.

The Master Block Policy 340 may be a global policy applied (e.g., by default) to every employee or user of the system 200 (or system 500) unless such employee/user belongs to one of the 3 AD groups 305, 310, and 315. For example, after enumerating the 2 entitlements 316, 317 under the SDP-App-Cloud-Dev AD group 305, the system 200 (or application owner 102) may automatically create 2 same or similar entitlements 345 and 346 under the Master Block Policy 340, except the latter two entitlements 345 and 346 bar access to all users not belonging to that SDP-App-Cloud-Dev AD group 315.

Each block entitlement 341-346 is configured to enforce a block rule on any user that does not belong to the 3 AD groups 315, 320, and 325 in FIG. 3. In other words, the Master Block Policy 340 may block a user 102 from accessing any particular domain or underlying application unless an application owner 202 grants permission to the user 102 (e.g., as a member of the appropriate AD group) via policy and entitlements such as described above. Thus, in this example, the 2 block entitlements 345 and 346 (matching entitlements 316 and 317) created under the Master Block Policy 340 are configured to bar all users from accessing the same IP address and same port unless such users belong to the SDP-App-Cloud-Dev AD group 315.

Figure 5:
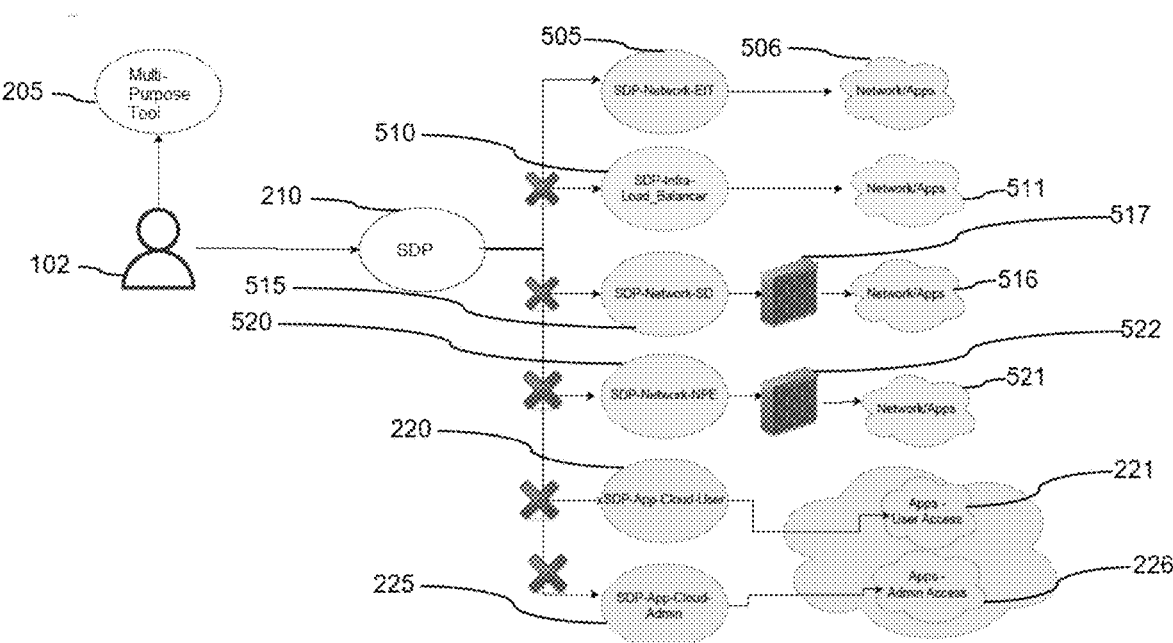
FIG. 5 is a block diagram of an SDP system according to an embodiment of the disclosure.

In an embodiment, the process of enumerating policy and entitlements may be extended to a plurality of different applications owners, e.g., owners of applications in system 200 (or system 500 in FIG. 5). Thus, while the Master Block Policy 340 in FIG. 3 may be specific to the application owner creating the policies and entitlements for the application owner's application(s), the Master Block Policy 340 may include policies and entitlements created by other application owners for other respective applications. Additionally, each set of policy and entitlements may be populated and stored into one or more databases (not shown) accessible to the system 200 (or system 500). For example, the one or more databases may be connected to or integrated with one or more of the multi-purpose tool 205, the SDP tool 210, and/or any other system component.

Figure 4:
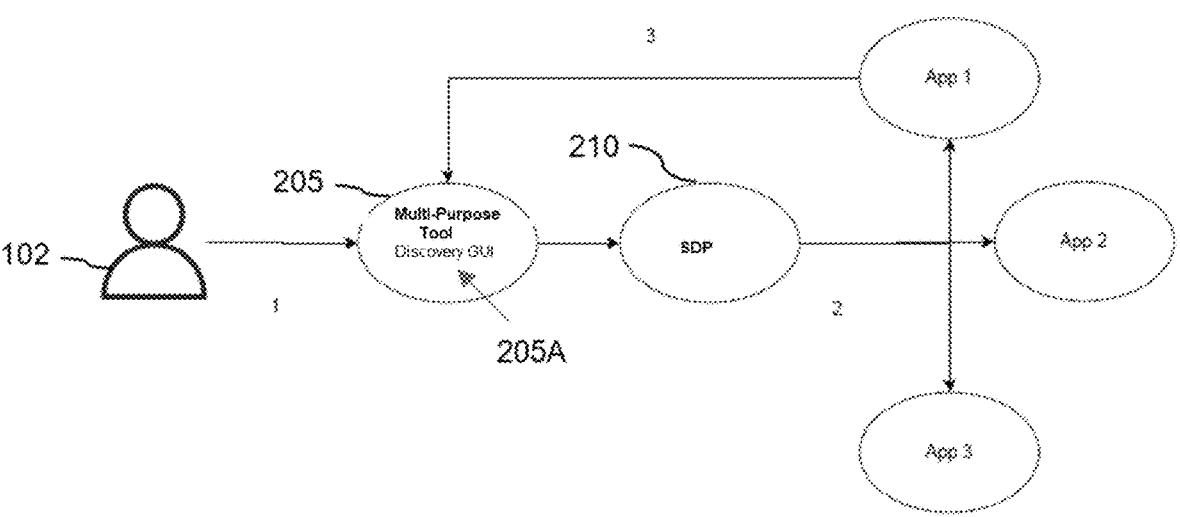
FIG. 4 is a schematic of a discovery scheme according to an embodiment of the disclosure.

Referring to FIG. 4, a schematic of a discovery scheme is described. In an embodiment, after application owners populate policies and entitlements for their respective applications in one or more databases (not shown), users (e.g., an employee 102) may self-provision themselves access to applications (e.g., App 1, App 2, App 3) on a network level. For discussion purposes, assume Apps 1, 2, and 3 correspond to the 3 policies enumerated for the 3 AD Groups 315-325 in FIG. 3.

In some aspects, the multi-purpose tool 205 may comprise a discovery function or GUI 205A for identifying applications, AD groups, or the like. For instance, a user 102 may use the discovery GUI 205A to search for a particular application by inputting information such as one or more of a port number, an IP address, a subnet, a host name, a server name, a policy name, or an application name associated with the application to which the user 102 seeks access. In turn, the multi-purpose tool 205 may search and parse the policy and entitlements information from the SDP tool 210 (e.g., via a database) to determine if there is a correct match between such information and the user input.

If not, the SDP tool 210 may notify the user 102 that there is no preexisting entitlement for the application. Additionally/alternatively, the SDP tool 210 may prompt the user for additional input, and if received, the SDP tool 210 may determine whether there is a correct match between the user input and the policy and entitlements information.

If a correct match exists, the SDP tool 210 may return the appropriate policy and/or AD group needed for the user 102 to access the particular application. In some cases, the 102 SDP tool 210 may return multiple results. Referring to the mapping 300 in FIG. 3, for example, if the 102 SDP tool 210 receives user input containing "Dev-AP Address 1," the 102 SDP tool 210 may return 2 policies for AD groups SDP-App-Cloud-Dev AD Group 315 and SDP-App-Cloud-Admin AD Group 325, as both policies include entitlements 316 and 330 containing "Dev-AP Address 1."

As previously mentioned, each policy returned to the user 102 may contain a brief description of what that policy is and/or what AD group the user 102 needs to access in order to obtain the access sought. Thus, in the aforementioned example, if the SDP tool 210 returns 2 policies for AD groups SDP-App-Cloud-Dev AD Group 315 and SDP-App-Cloud-Admin AD Group 325, the user 102 may ascertain which AD group 315 or 325 is needed based on the description contained in each respective policy. After a user 102 selects or otherwise obtains an appropriate policy from the SDP tool 210, the user 102 may request access to the corresponding AD group containing the particular application (e.g., App 1, App 2, or App 3) sought by the user 102.

Assume, for example, the user 102 is a developer and ascertains (e.g., based on descriptive information in the policy/policies returned to the user) that the user 102 needs to access the SDP-App-Cloud-Dev AD Group 315. If the user 102 is not a member of this group 315, the system 500 may prevent the user 102 from accessing the SDP-App-Cloud-Dev AD Group 315 and its underlying resources 316 unless the user 102 is a member of the SDP-App-Cloud-Dev AD Group 315. If the user 102 is not a member, the user 102 may send, via the multi-purpose 205 and/or the SDP tool 210, an access request message to an application or domain owner associated with the SDP-App-Cloud-Dev AD Group 315. The access request message may comprise user parameters (e.g., user identifier, IP address, etc.) for the application or domain owner to authenticate/authorize the user 102.

If the user's access request is granted, the application or domain owner (not shown in FIG. 5) may add the user 102 to the SDP-App-Cloud-Dev AD Group 315. Once added, the user 102 need not send subsequent access requests to the application or domain owner associated with the SDP-App-Cloud-Dev AD Group 315. Instead, each time the user 102 connects or logs into the system 500 (e.g., via a client-based application/program running on the user's client device), the user 102 may be allowed to access the SDP-App-Cloud-Dev AD Group 315 and one or more of its underlying applications (e.g., within resources 316).

Referring to FIG. 5, an example of an SDP system 500 is depicted according to an embodiment of the disclosure. The SDP system 500 may include one or more AD groups such as SDP-Network-EIT group 505, SDP-Infrastructure (Infra)-Load_Balancer group 510, SDP-Network-Secure Data (SD) group 515, and SDP-Network-Non-Production Environment (NPE) group 520, with each group 505, 510, 515, and 520 having respective resources 506, 511, 516, and 521 (e.g., such as network segments, applications, objects, etc.). The SDP system 500 in this example further includes the SDP-App-Cloud-User AD Group 220 having user-level applications 221 and the SDP-App-Cloud-Admin AD Group 225 having admin-level applications 226. Of course, the SDP system 500 may include more or less AD groups in other aspects.

In this example, the SDP-Network-EIT group 505, SDP-Infra-Load_Balancer group 510, SDP-Network-SD group 515, SDP-Network-NPE group 520 represent entire networks rather than individual applications. Additionally, the SDP-Network-EIT group 505, the SDP-Network-SD group 515, and the SDP-Network-NPE group 520 may be viewed as being part of the VPN-Network-EIT group 110, the VPN-Network-PCI group 120, and the VPN-Network-DMZ group 125 in FIG. 1.

The "X" marks in FIG. 5 represent block actions, which may be presented to the user 102 on a default level. In other words, the user 102 may be added to the SDP-Network-EIT group 505 by default, and thus user 102 may have access to the SDP-Network-EIT group 505 and its underlying resources 506. If the user 102 wants to access one of the other AD groups in FIG. 5, the user 102 may send an access request to be added to that group. For example, should the user 102 request and obtain permission to access the SDP-App-Cloud-User group 220, the "X" mark next to the SDP-App-Cloud-User group 220 in FIG. 4 may be removed (or an allow action may be applied). The user 102 would then be granted access to one or more applications 221 on the user level, as designated by the application owner via the policy and entitlements for the SDP-App-Cloud-User group 220. For instance, the policy and entitlements for this group 220 may specify that the user 102 is entitled access to one or more specific applications in the SDP-App-Cloud-User group 220, while one or more corresponding block entitlements may restrict the user 102 from accessing other applications 221 in the SDP-App-Cloud-User group 220, thereby enabling fine-grained access to one or more specific applications within the group 220.

Figure 6:
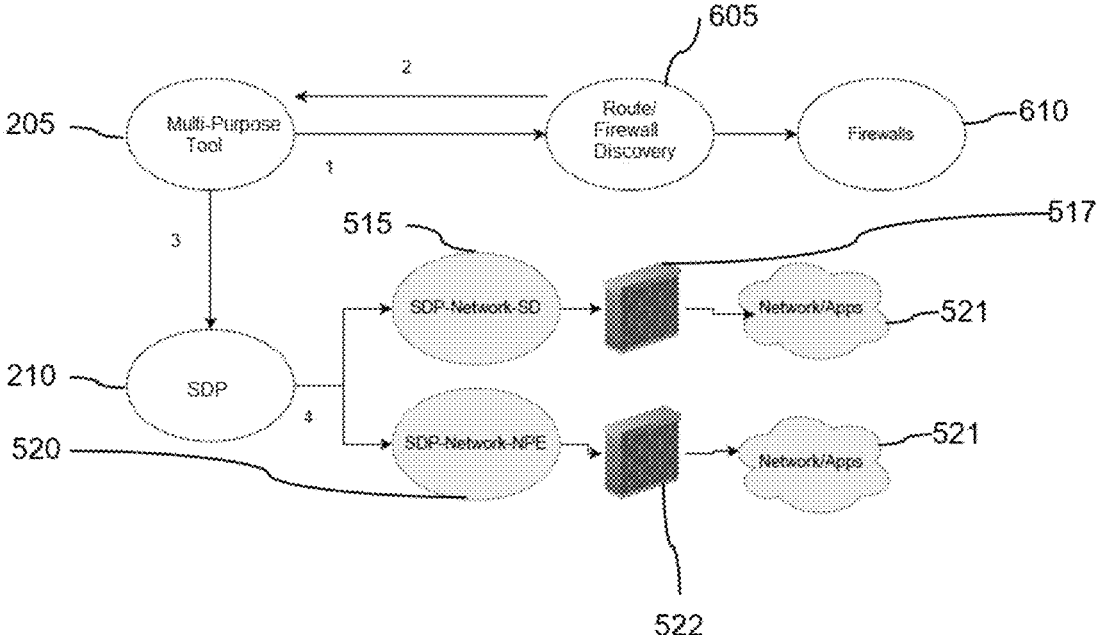
FIG. 6 is a schematic of a system automation scheme according to an embodiment of the disclosure.

Referring to FIG. 6, an example of system automation will now be described. In an embodiment, the multi-purpose tool 205 may be connected or integrated with a firewall network route discovery tool 605, which may be automatically populated with firewall information 610 as firewalls (and/or their supported subnets) are added to or removed from the system 500. For example, assume firewalls 517 and 522 have been added to the system 500.

In operation, the multi-purpose tool 205 may send a query to retrieve firewall information corresponding to the firewalls 517 and 522 from the firewall network route discovery tool 605. In some aspects, the multi-purpose tool 205 may be configured to automatically send this query to the firewall network route discovery tool 605, such as a periodically or periodically (e.g., according to a scheduled interval). Additionally/alternatively, the multi-purpose tool 205 may be configured to send this query to the firewall network route discovery tool 605 on demand (e.g., upon user request).

Upon receiving firewall information from the firewall network route discovery tool 605 responsive to the query, the multi-purpose tool 205 may parse and automatically upload such firewall information to the SDP tool 210. In turn, a separate set of policy and entitlements may be created for the firewalls 517 and 522, as well as one or more blocking rules. The blocking rule(s) and each set of policy and entitlements may then be automatically enforced to the various network segments in a system (such as system 500 in FIG. 5). It should be noted that such firewall policies and entitlements need not be created by an owner of an application in a domain separated by a firewall. For example, an application owner may create a policy and entitlements for an application in the resources 516 of the SDP-Network-SD AD Group 515, while another individual (e.g., operations or security personnel) may define the policy and entitlements for getting through the firewall 517 separating the SDP-Network-SD AD Group 515 and resources 516.

Referring now to FIG. 7, a flowchart is shown of a method 700 for generating a granular access mapping table according to an embodiment of the present disclosure. For discussion purposes, the method 700 will be described using an example where an application owner 202 uses the multi-purpose tool 205 to create the granular access mapping table 300 from FIG. 3. As such, the method 700 may begin at block 702, which comprises creating one or more policies for an application, such as the policies denoted as "SDP-App-Cloud-Dev," "SDP-App-Cloud-User," and "SDP-App-Cloud-Dev" in FIG. 3. When creating each policy, the application owner 202 may provide a description and/or notes (e.g., via a network object, IE, etc.) regarding the purpose of each respective policy and/or AD group. Thus, the step of providing such description/notes may occur in block 702, or this step may be incorporated at a different point (e.g., before, after, or with another block) of the method 700 and/or via a separate block (not shown) of the method 700.

At block 704, the method 700 comprises creating entitlements desired/needed for all levels of ports, where different levels may refer to different ports (e.g., a developer may need different ports than a user may need). In other words, the application owner 202 in block 704 may enumerate entitlements specifying what type of access and IP/port information are to be used by a user to successfully access the application owner's application.

At block 706, the method 700 comprises creating levels of role required for the application. That is, the application owner 202 may dictate how many different roles are necessary for a user to access the application owner's application(s). FIG. 3, for example, is based on a scenario where the application owner 202 specifies 3 separate roles for a developer, a user, and an administrator. In this example, therefore, the application owner 202 in block 706 may create an AD group for each role, i.e., an "SDP-App-Cloud-Dev AD Group" 315, an "SDP-App-Cloud-User AD Group" 320, and an "SDP-App-Cloud-Admin AD Group" 325 as shown in FIG. 3.

At block 708, the method 700 comprises mapping the levels from block 706 to application roles. Here, the application owner 202 may specify what type of entitlement(s) a role would need, or what types of entitlements are required for each level of role. For example, a developer may need one or more development IP addresses on one or more ports (e.g., "Dev-IP Address 1" and "Dev-IP Address 2" on port 443 in FIG. 3) of a development network or environment, while a user may need one or more production IP addresses (e.g., "Production IP Address 1" and "Production IP Address 2" in FIG. 3) on one or more production ports.

At block 710, the method 700 comprises creating a corresponding block rule in response to creating an allow entitlement. Such corresponding block rule(s) may be created so as to impose restrictions on created entitlements, e.g., to prevent access to all available network ports, which may range from port 1 to port 65535. In some aspects, after the application owner 202 creates an allow block such as entitlement 316 in FIG. 3, the system 200 may automatically create (e.g., on the backend) an equivalent entitlement block 345 and assign it to a Master Block Policy 340. In some aspects, the application owner 202 may manually create and assign the equivalent entitlement block 345 to the Master Block Policy 340, which may comprise or be connected to one or more databases configured to store policy/entitlement information for a plurality of application owners.

Figure 8:
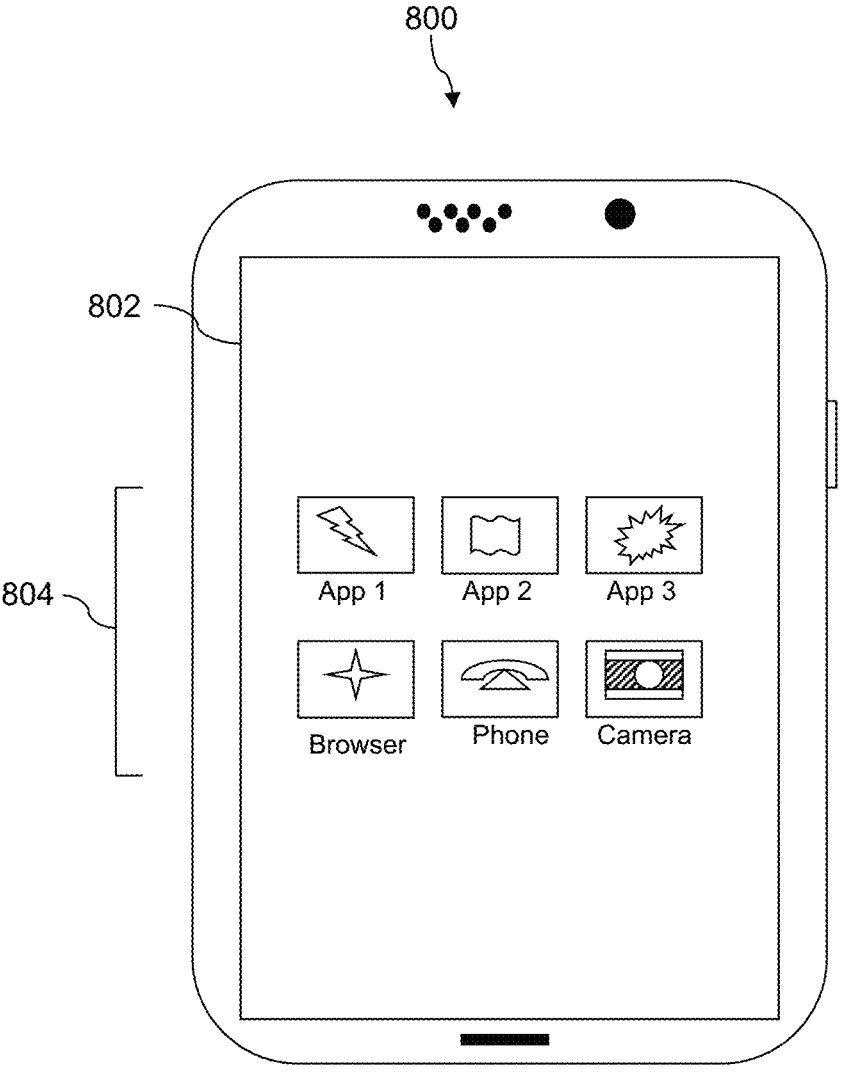
FIG. 8 is an illustration of a communication device according to an embodiment of the disclosure.

FIG. 8 depicts a communication device 800, which is operable for implementing aspects of the present disclosure, but the present disclosure should not be limited to these implementations. Though illustrated as a mobile phone 800 such as a user equipment (UE), the communication device 800 may take various forms including, e.g., a wireless handset, a pager, a laptop, a personal digital assistant (PDA), a gaming device, a media player, or the like. The communication device 800 includes a touchscreen display 802 having a touch-sensitive surface for input by a user, e.g., employee, employer, application owner, administrator, etc. A small number of application icons 804 are illustrated within the touch screen display 802. It is understood that in different embodiments, any number of application icons 804 may be presented in the touch screen display 802. In some embodiments of the communication device 800, a user may be able to download and install additional applications on the communication device 800, and an icon associated with such downloaded and installed applications may be added to the touch screen display 802 or to an alternative screen. The communication device 800 may have other components such as electro-mechanical switches, speakers, camera lenses, microphones, input and/or output connectors, and other components as are well known in the art.

The communication device 800 may present options for the user to select, controls for the user to actuate, and/or cursors or other indicators for the user to direct. The communication device 800 may further accept data entry from the user, including numbers to dial or various parameter values for configuring the operation of the handset. The communication device 800 may further execute one or more software or firmware applications in response to user commands. These applications may configure the communication device 800 to perform various customized functions in response to user interaction. Additionally, the communication device 800 may be programmed and/or configured over-the-air, for example from a wireless base station, a wireless access point, or a peer communication device. The communication device 800 may execute a web browser application, which enables the touch screen display 802 to show a web page. The web page may be obtained via wireless communications with a base transceiver station, a wireless network access node, a peer communication device 800 or any other wireless communication network or system.

Figure 9:
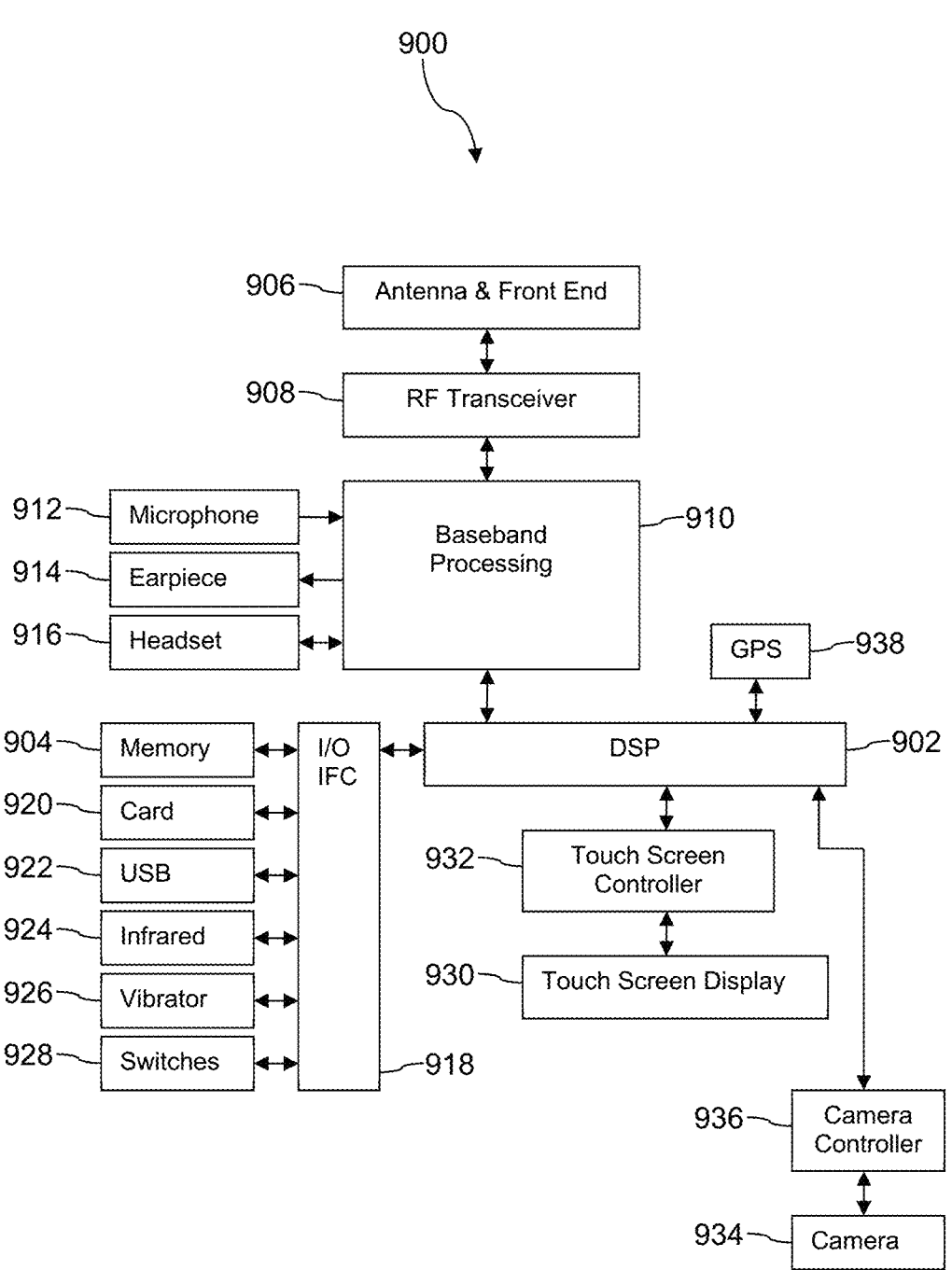
FIG. 9 is a block diagram of a hardware architecture of a communication device according to an embodiment of the disclosure.

FIG. 9 shows a block diagram of an architecture of a communication device 900 for implementing one or more embodiments of the disclosure. In some aspects, the communication device 900 may comprise the client device 800 of FIG. 8. However, the communication device 900 may comprise any suitable communication/computing device (e.g., a general-purpose computer) in other aspects. While a variety of known components of communication devices are depicted, a subset of the listed components and/or additional components not listed may be included in the communication device 900. Similarly, the communication device 900 may comprise less components than those listed in FIG. 9.

The communication device 900 includes a digital signal processor (DSP) 902 and a memory 904. As shown, the communication device 900 may further include one or more antenna and front end unit 906, a one or more radio frequency (RF) transceiver 908, a baseband processing unit 910, a microphone 912, an earpiece speaker 914, a headset port 916, an input/output interface 918, a removable memory card 920, a universal serial bus (USB) port 922, an infrared port 924, a vibrator 926, one or more electromechanical switches 928, a touch screen display 930, a touch screen controller 932, a camera 934, a camera controller 936, and a global positioning system (GPS) receiver 938.

In an embodiment, the communication device 900 may include another kind of display that does not provide a touch sensitive screen. In an embodiment, the communication device 900 may include both the touch screen display 930 and additional display component that does not provide a touch sensitive screen. In an embodiment, the DSP 902 may communicate directly with the memory 904 without passing through the input/output interface 918. Additionally, in an embodiment, the communication device 900 may comprise other peripheral devices that provide other functionality.

The DSP 902 or some other form of controller or central processing unit operates to control the various components of the communication device 900 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The DSP 902 may communicate with a wireless network via a analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the communication device 900 to function as a peripheral device to exchange information with a personal computer or other computer system. The infrared port 924 and other optional ports such as a Bluetooth® interface or an IEEE 802.11 compliant wireless interface may enable the communication device 900 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5th Generation (5G), a Long-Term Evolution (LTE), a code division multiple access (CDMA), a global system for mobile communications (GSM) wireless communication protocol. In an embodiment, one of the radio transceivers 908 may comprise a near field communication (NFC) transceiver. The NFC transceiver may be used to complete payment transactions with point-of-sale terminals or other communications exchanges. In an embodiment, each of the different radio transceivers 908 may be coupled to its own separate antenna. In an embodiment, the communication device 900 may comprise a radio frequency identify (RFID) reader and/or writer device.

The switches 928 may couple to the DSP 902 via the input/output interface 918 to provide one mechanism for the user to provide input to the communication device 900. Alternatively, one or more of the switches 928 may be coupled to a motherboard of the communication device 900 and/or to components of the communication device 900 via a different path (e.g., not via the input/output interface 918), for example coupled to a power control circuit (power button) of the communication device 900. The touch screen display 930 is another input mechanism, which may further display text and/or graphics to the user. The touch screen LCD controller 932 couples the DSP 902 to the touch screen display 930. The GPS receiver 938 is coupled to the DSP 902 to decode global positioning system signals, thereby enabling the communication device 900 to determine its position.

In some embodiments, one or more network functions described herein may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs.

Figure 10A:
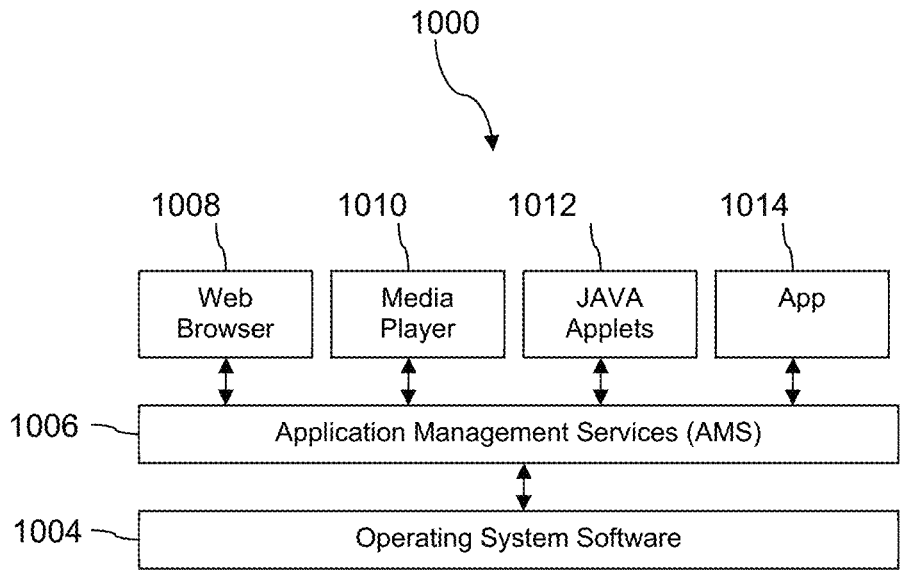
FIG. 10A is a block diagram of a software architecture of a communication device according to an embodiment of the disclosure.

FIG. 10A illustrates a software environment 1000 that may be implemented by a processing device. For discussion purposes, the software environment 1000 will be described as being implemented by the DSP 902 in FIG. 9. The DSP 902 executes operating system software 1004 that provides a platform from which the rest of the software operates. The operating system software 1004 may provide a variety of drivers for the handset hardware with standardized interfaces that are accessible to application software. The operating system software 1004 may be coupled to and interact with application management services (AMS) 906 that transfer control between applications 1014 running on the communication device 900. Also shown in FIG. 10A are a web browser application 1008, a media player application 1010, and JAVA applets 1012. The web browser application 1008 may be executed by the communication device 900 to browse content and/or the Internet, for example when the communication device 900 is coupled to a network via a wireless link. The web browser application 1008 may permit a user to enter information into forms and select links to retrieve and view web pages. The media player application 1010 may be executed by the communication device 900 to play audio or audiovisual media. The JAVA applets 1012 may be executed by the communication device 900 to provide a variety of functionality including games, utilities, and other functionality.

Figure 10B:
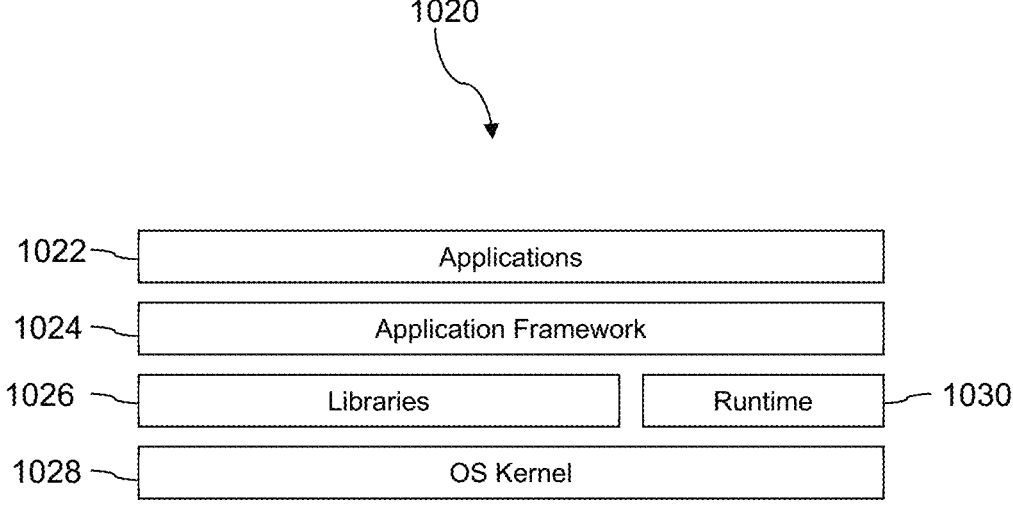
FIG. 10B is a block diagram of another software architecture of a communication device according to an embodiment of the disclosure.

FIG. 10B illustrates an alternative software environment 1020 that may be implemented by a processing device such as the DSP 902 in FIG. 9. The DSP 902 is configured to execute operating system kernel (OS kernel) 1028 and an execution runtime 1030. The DSP 902 executes applications 1022 that may execute in the execution runtime 1030 and may rely upon services provided by the application framework 1024. Applications 1022 and the application framework 1024 may rely upon functionality provided via the libraries 1026.

Figure 11:
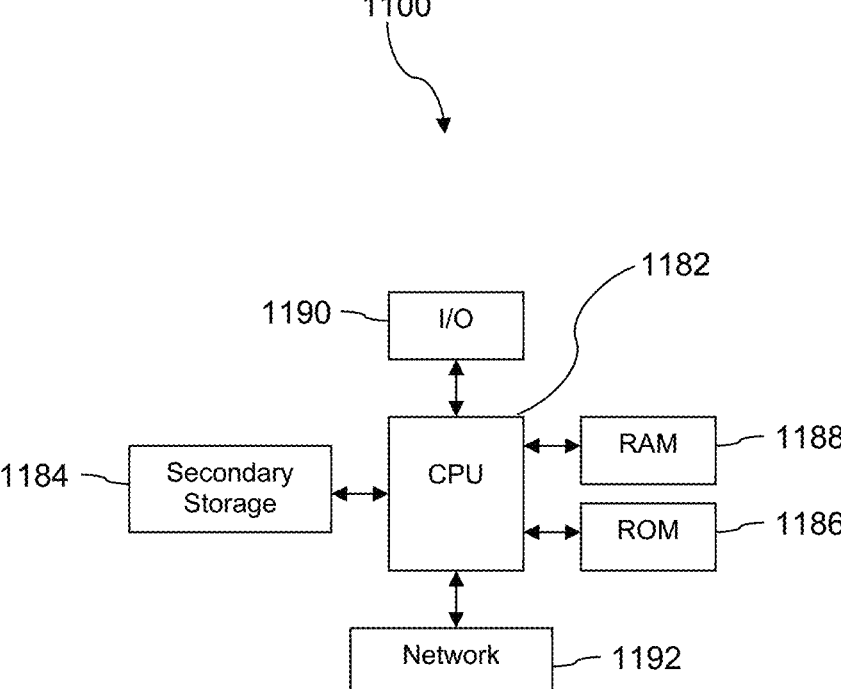
FIG. 11 is a block diagram of a computer system according to an embodiment of the disclosure.

FIG. 11 illustrates a computer system 1100 suitable for implementing any one or more embodiments disclosed herein. The computer system 1100 includes a processor 1182 (which may be referred to as a central processor unit or CPU) that is in communication with memory devices including secondary storage 1184, read only memory (ROM) 1186, random access memory (RAM) 1188, input/output (I/O) devices 1190, and network connectivity devices 1192. The processor 1182 may be implemented as one or more CPU chips.

It is understood that by programming and/or loading executable instructions onto the computer system 1100, at least one of the CPU 1182, the RAM 1188, and the ROM 1186 are changed, transforming the computer system 1100 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain.

Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1100 is turned on or booted, the CPU 1182 may execute a computer program or application. For example, the CPU 1182 may execute software or firmware stored in the ROM 1186 or stored in the RAM 1188. In some cases, on boot and/or when the application is initiated, the CPU 1182 may copy the application or portions of the application from the secondary storage 1184 to the RAM 1188 or to memory space within the CPU 1182 itself, and the CPU 1182 may then execute instructions that the application is comprised of. In some cases, the CPU 1182 may copy the application or portions of the application from memory accessed via the network connectivity devices 1192 or via the I/O devices 1190 to the RAM 1188 or to memory space within the CPU 1182, and the CPU 1182 may then execute instructions that the application is comprised of. During execution, an application may load instructions into the CPU 1182, for example load some of the instructions of the application into a cache of the CPU 1182. In some contexts, an application that is executed may be said to configure the CPU 1182 to do something, e.g., to configure the CPU 1182 to perform the function or functions promoted by the subject application. When the CPU 1182 is configured in this way by the application, the CPU 1182 becomes a specific purpose computer or a specific purpose machine.

The secondary storage 1184 is typically comprised of one or more disk drives or tape drives and is used for non-volatile storage of data and as an over-flow data storage device if RAM 1188 is not large enough to hold all working data. Secondary storage 1184 may be used to store programs which are loaded into RAM 1188 when such programs are selected for execution. The ROM 1186 is used to store instructions and perhaps data which are read during program execution. ROM 1186 is a non-volatile memory device which typically has a small memory capacity relative to the larger memory capacity of secondary storage 1184. The RAM 1188 is used to store volatile data and perhaps to store instructions. Access to both ROM 1186 and RAM 1188 is typically faster than to secondary storage 1184. The secondary storage 1184, the RAM 1188, and/or the ROM 1186 may be referred to in some contexts as computer readable storage media and/or non-transitory computer readable media.

I/O devices 1190 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1192 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards, and/or other well-known network devices. The network connectivity devices 1192 may provide wired communication links and/or wireless communication links (e.g., a first network connectivity device 1192 may provide a wired communication link and a second network connectivity device 1192 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), Long-Term Evolution (LTE), Wi-Fi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 1192 may enable the processor 1182 to communicate with the Internet or one or more intranets. With such a network connection, it is contemplated that the processor 1182 might receive information from the network, or might output information to the network in the course of performing the above-described method steps. Such information, which is often represented as a sequence of instructions to be executed using processor 1182, may be received from and outputted to the network, for example, in the form of a computer data signal embodied in a carrier wave.

Such information, which may include data or instructions to be executed using processor 1182 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 1182 executes instructions, codes, computer programs, scripts which it accesses from hard disk, floppy disk, optical disk (these various disk-based systems may all be considered secondary storage 1184), flash drive, ROM 1186, RAM 1188, or the network connectivity devices 1192. While only one processor 1182 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1184, for example, hard drives, floppy disks, optical disks, and/or other device, the ROM 1186, and/or the RAM 1188 may be referred to in some contexts as non-transitory instructions and/or non-transitory information.

In an embodiment, the computer system 1100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1100 to provide the functionality of a number of servers that is not directly bound to the number of computers in the computer system 1100. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others.

The computer program product may be suitable for loading, by the computer system 1100, at least portions of the contents of the computer program product to the secondary storage 1184, to the ROM 1186, to the RAM 1188, and/or to other non-volatile memory and volatile memory of the computer system 1100. The processor 1182 may process the executable instructions and/or data structures in part by directly accessing the computer program product, for example by reading from a CD-ROM disk inserted into a disk drive peripheral of the computer system 1100. Alternatively, the processor 1182 may process the executable instructions and/or data structures by remotely accessing the computer program product, for example by downloading the executable instructions and/or data structures from a remote server through the network connectivity devices 1192. The computer program product may comprise instructions that promote the loading and/or copying of data, data structures, files, and/or executable instructions to the secondary storage 1184, to the ROM 1186, to the RAM 1188, and/or to other non-volatile memory and volatile memory of the computer system 1100.

In some contexts, the secondary storage 1184, the ROM 1186, and the RAM 1188 may be referred to as a non-transitory computer readable medium or a computer readable storage media. A dynamic RAM embodiment of the RAM 1188, likewise, may be referred to as a non-transitory computer readable medium in that while the dynamic RAM receives electrical power and is operated in accordance with its design, for example during a period of time during which the computer system 1100 is turned on and operational, the dynamic RAM stores information that is written to it. Similarly, the processor 1182 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for discovering membership groups to access enterprise applications, the method comprising:

creating, via a discovery application running on a computing device, one or more entitlement rules specifying computing resources for accessing enterprise applications within a membership group;

creating, via the discovery application, one or more blocking rules corresponding to each of the one or more entitlement rules in response to creating each entitlement rule, wherein the one or more blocking rules are configured to restrict access to one or more of the enterprise applications within the membership group for a subset of one or more users in the membership group;

receiving, via the discovery application, user input from a user, wherein the user is included in the subset of one or more users in the membership group, wherein the user input identifies at least one of an application name, a server name, or an Internet Protocol (IP) address associated with a computing resource for accessing an enterprise application, and wherein the computing resource is one of the computing resources within the membership group and the enterprise application is one of the enterprise applications within the membership group;

comparing, via the discovery application, the user input to application information stored in a database accessible by the discovery application;

sending, via the discovery application, a message to the user in response to determining a match between the user input and the application information, wherein the message identifies the membership group containing the computing resource for accessing the enterprise application; and enabling the user to access the enterprise application using the computing resource based on the one or more entitlement rules while restricting the user from accessing at least another one of the enterprise applications in the membership group based on the one or more blocking rules.

2. The method of claim 1, wherein the application information comprises rules for accessing computing resources in a plurality of membership groups including a first membership group.

3. The method of claim 2, wherein the plurality of membership groups comprises a plurality of active directory (AD) groups.

4. The method of claim 1, wherein before enabling the user to access the enterprise application, the method further comprises forwarding, via the discovery application, an access request from the user to an owner of the membership group.

5. The method of claim 1, wherein the message comprises descriptive information about the membership group.

6. The method of claim 1, wherein the computing resource comprises at least one of a server or a port associated with the membership group.

7. A method for enabling fine-grained access to enterprise applications, the method comprising:

defining, via a discovery application running on a computing device, an access policy for a membership group;

creating, via the discovery application, one or more entitlement rules specifying computing resources for accessing enterprise applications within the membership group;

creating, via the discovery application, one or more blocking rules corresponding to each of the one or more entitlement rules in response to creating each entitlement rule, wherein the one or more blocking rules are configured to restrict access to one or more of the enterprise applications within the membership group for a subset of one or more users in the membership group;

receiving, via the discovery application, a request from a user to access at least one of the enterprise applications in the membership group, wherein the user is included in the subset of one or more users in the membership group; and granting the user access to at least one of the enterprise applications in the membership group based on the one or more entitlement rules while restricting the user from accessing at least another one of the enterprise applications in the membership group based on the one or more blocking rules.

8. The method of claim 7, wherein the membership group comprises an active directory (AD) group.

9. The method of claim 7, wherein the one or more entitlement rules are defined by an owner of the enterprise applications.

10. The method of claim 7, further comprising storing each of the one or more blocking rules in a master block policy accessible to the discovery application.

11. The method of claim 10, further comprising storing the one or more entitlement rules in the master block policy.

* * * * *